United States Patent
Ho et al.

(10) Patent No.: US 8,421,895 B2
(45) Date of Patent: *Apr. 16, 2013

(54) IMAGE SENSING DEVICE AND IMAGE SENSING METHOD

(75) Inventors: Le-Chun Ho, Hsinchu (TW); Wen-Cheng Yen, Hsinchu (TW); Keng-Hao Chang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,001

(22) Filed: Mar. 5, 2012

(65) Prior Publication Data

US 2012/0162489 A1    Jun. 28, 2012

Related U.S. Application Data

(63) Continuation of application No. 12/437,764, filed on May 8, 2009, now Pat. No. 8,164,667.

(51) Int. Cl.
*H04N 3/14* (2006.01)

(52) U.S. Cl.
USPC .......................... 348/308; 348/294

(58) Field of Classification Search .................. 348/308, 348/294, 302; 250/208.1
See application file for complete search history.

(56) References Cited

U.S. PATENT DOCUMENTS

| | | | |
|---|---|---|---|
| 7,420,602 B2 | 9/2008 | Fraenkel et al. | |
| 7,626,624 B2 | 12/2009 | Fraenkel et al. | |
| 8,164,667 B2 * | 4/2012 | Ho et al. | 348/308 |

* cited by examiner

*Primary Examiner* — Hung Dang
(74) *Attorney, Agent, or Firm* — Rabin & Berdo, P.C.

(57) ABSTRACT

An image sensing device and image sensing method is described, in which an interrupt circuit is disposed to interrupt a clock signal input to a logic circuit not associated with the reading of image data when the image data is read, so as to temporarily interrupt the operation of the logic circuit, thereby reducing the power noises caused by the current generated during the operation of the logic circuit.

8 Claims, 5 Drawing Sheets

IMAGE SENSING DEVICE AND IMAGE SENSING METHOD

CROSS-REFERENCE TO RELATED APPLICATIONS

This application is a continuation of parent application Ser. No. 12/437,764, filed May 8, 2009, now U.S. Pat. No. 8,164,667 the entire disclosure of which is incorporated herein by reference

BACKGROUND

1. Field of the Invention

The present invention relates to an image sensing system, and more particularly to an image sensing device and an image sensing method.

2. Related Art

In the modern society with rich information, image delivery has become one of the most important means for people to deliver messages. With the rapid progress of science and technology, the image sensing system has been widely used in many fields, such as medical treatment, outer space, military, and people's livelihood.

In the image sensing system, an image sensor is mainly used to capture an image. The basic principle of the image sensing system is projecting an image onto an image array of the image sensor, capturing the image through the image array, acquiring digital image data corresponding to the image through the signal processing motion of an electronic circuit, and storing the acquired digital image signal into a storage medium.

The image sensors currently available in the market are mainly classified into two types, namely, charge coupled devices (CCDs), and complementary metal-oxide-semiconductor (CMOS) image sensors.

Compared with the CCD, the CMOS image sensor has a lower operation voltage, lower operation power, lower manufacturing cost, and higher read rate, and the CMOS image sensor is easily zoomed out, and capable of realizing system-on-a-chip (SOC) (i.e., high integrity). Therefore, with the progress of the CMOS manufacturing process, people have paid more and more attention to the CMOS image sensor, and the CMOS image sensor has a large potential of development.

Generally speaking, in the image sensing system, the image sensor is couple to the image processing unit, so as to facilitate the receiving and processing of the captured image data. Although the elimination processing of the noises in the image data is performed after the image data is captured, the image data corresponding to the image can be acquired more effectively if the noise source is reduced during capturing the image to avoid generating noises.

SUMMARY

Accordingly, the present invention is an image sensing device and an image sensing method, so as to solve the problem in the prior art that the quality of the captured image data is affected by the noise generated by the noise source during the image capturing process.

An image sensing device is provided according to the present invention, which comprises: a timing generator, an image capturing circuit, at least a first logic circuit, at least a second logic circuit, and an interrupt circuit.

The first logic circuit is electrically connected between the image capturing circuit and the timing generator. The second logic circuit is electrically connected to the image capturing circuit. The interrupt circuit is electrically connected between the timing generator and the second logic circuit.

The timing generator receives a system clock, and outputs a clock signal according to the system clock. The first logic circuit receives the clock signal, and controls the operation of the image capturing circuit according to the clock signal. Here, the image sensing process can be approximately divided into a sensing duration and a reading duration. The image capturing circuit senses a capturing signal during the sensing duration, and reads the capturing signal during the reading duration and generates an image signal. The interrupt circuit provides the clock signal to the second logic circuit during the sensing duration, and stops providing the clock signal to the at least a second logic circuit during the reading duration.

An image sensing method is provided according to the present invention, which comprises: generating a control signal by a first logic circuit according to a clock signal; inputting the clock signal to a second logic circuit; controlling to read image data by using the control signal; and interrupting the clock signal input to the second logic circuit when reading the image data.

To sum up, the image sensing device and the image sensing method of the present invention are applicable to the image sensing system, in which the interrupt circuit is used to interrupt the system clock input to the second logic circuit during the process of reading the image data, thereby reducing the power noises caused by the current generated during the operation of the logic circuit.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
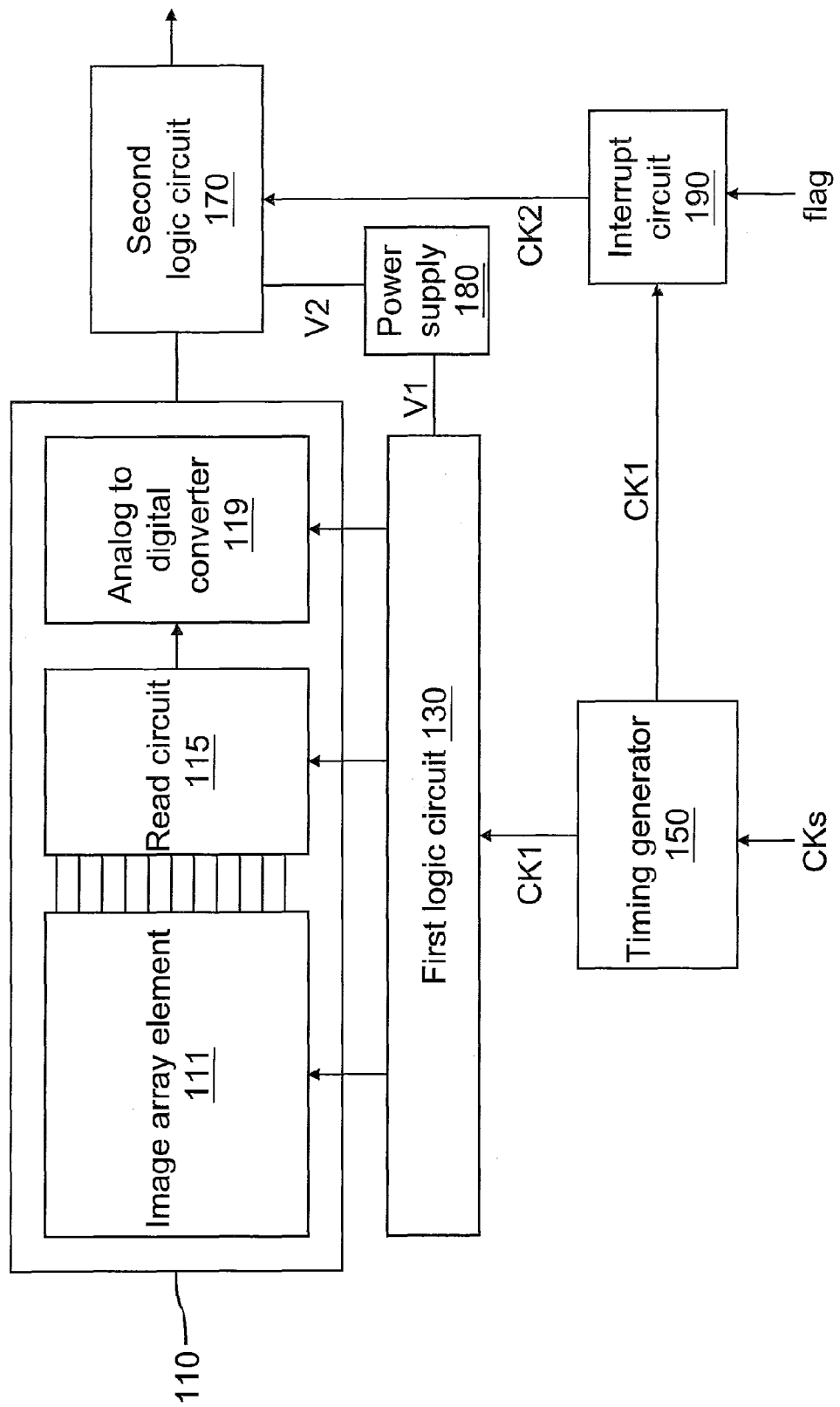
FIG. 1 is a summarized schematic view of an image sensing device according to an embodiment of the present invention.

FIG. 1 shows an image sensing device according to an embodiment of the present invention.

The image sensing device comprises an image capturing circuit 110, a plurality of logic circuits, a timing generator 150, and an interrupt circuit 190.

In the image sensing device, all the associated logic circuit are classified into logic circuits associated with reading of the image data (i.e., a first logic circuit 130) and logic circuits not associated with reading of the image data (i.e., a second logic circuit 170). In other words, the image sensing process can be approximately divided into a sensing duration and a reading duration.

The first logic circuit 130 is electrically connected between the image capturing circuit 110 and the timing generator 150. The second logic circuit 170 is electrically connected to the image capturing circuit 110. The interrupt circuit 190 is electrically connected between the timing generator 150 and the second logic circuit 170.

An output end of the interrupt circuit 190 is electrically connected to an input end of the second logic circuit 170.

Here, the first logic circuit 130 and the second logic circuit 170 respectively belong to different circuits performing different functions.

The image capturing circuit 110 comprises an image array element 111 and a read circuit 115.

During the sensing duration, the image capturing circuit 110 senses and stores a capturing signal. During the reading duration, the image capturing circuit 110 reads the capturing signal and generates an image signal accordingly.

After a plurality of pixel signals (i.e., capturing signals) is read from the image array element 111 via a signal line, the read circuit 115 performs noise removal and/or signal amplification to output the image data (i.e., image signal) of an analog signal.

An analog to digital converter 119 may be electrically connected to an output end of the read circuit 115, i.e., the analog to digital converter 119 is electrically connected to the image capturing circuit 110. Thus, the analog to digital converter 119 converts the image data read by the read circuit 115 from an analog signal into a digital signal, so as to provide the image data of the digital signal to an image processing unit in a subsequent stage to perform various image processing operations.

The first logic circuit 130 and the second logic circuit 170 can be electrically connected to a power supply 180. The power supply 180 provides voltages V1 and V2 respectively required by the first logic circuit 130 and the second logic circuit 170 during operation.

Here, the timing generator 150 receives system clocks CKs, and generates a clock signal CK1 to the first logic circuit 130 and the second logic circuit 170 according to the system clocks CKs. Then, the first logic circuit 130 generates a control signal according to the clock signal CK1, so as to control the operation of the image capturing circuit 110 by the control signal. For example, the first logic circuit 130 may utilize the control signal to control the image array element 111 to capture an image, so as to acquire a plurality of pixel signals, and the first logic circuit 130 may utilize the control signal to control the read circuit 115 to sample the pixel signals acquired by the image array element 111 to generate the image data.

The second logic circuit 170 receives the clock signal CK1 via the interrupt circuit 190 and operates according to the received clock signal CK1. In other words, the output end of the interrupt circuit 190 is electrically connected to the input end of the second logic circuit 170. Thus, the interrupt circuit 190 selectively outputs the clock signal CK1 to the second logic circuit 170.

During the process of reading the image data, a flag signal flag is generated, so that the interrupt circuit 190 interrupts the clock signal CK1 input to the second logic circuit 170 according to the flag signal flag. In other words, during the process of reading the image data, the interrupt circuit 190 does not output the clock signal CK1 to the second logic circuit 170. In this manner, the power noises caused by the current generated during the operation of the logic circuit (i.e., the second logic circuit 170) are reduced. Here, the flag signal flag may be generated by the image capturing circuit 110, i.e., the image capturing circuit 110 may be electrically connected to the interrupt circuit 190 (not shown). Alternatively, the flag signal flag is generated by the timing generator 150.

Figure 2:
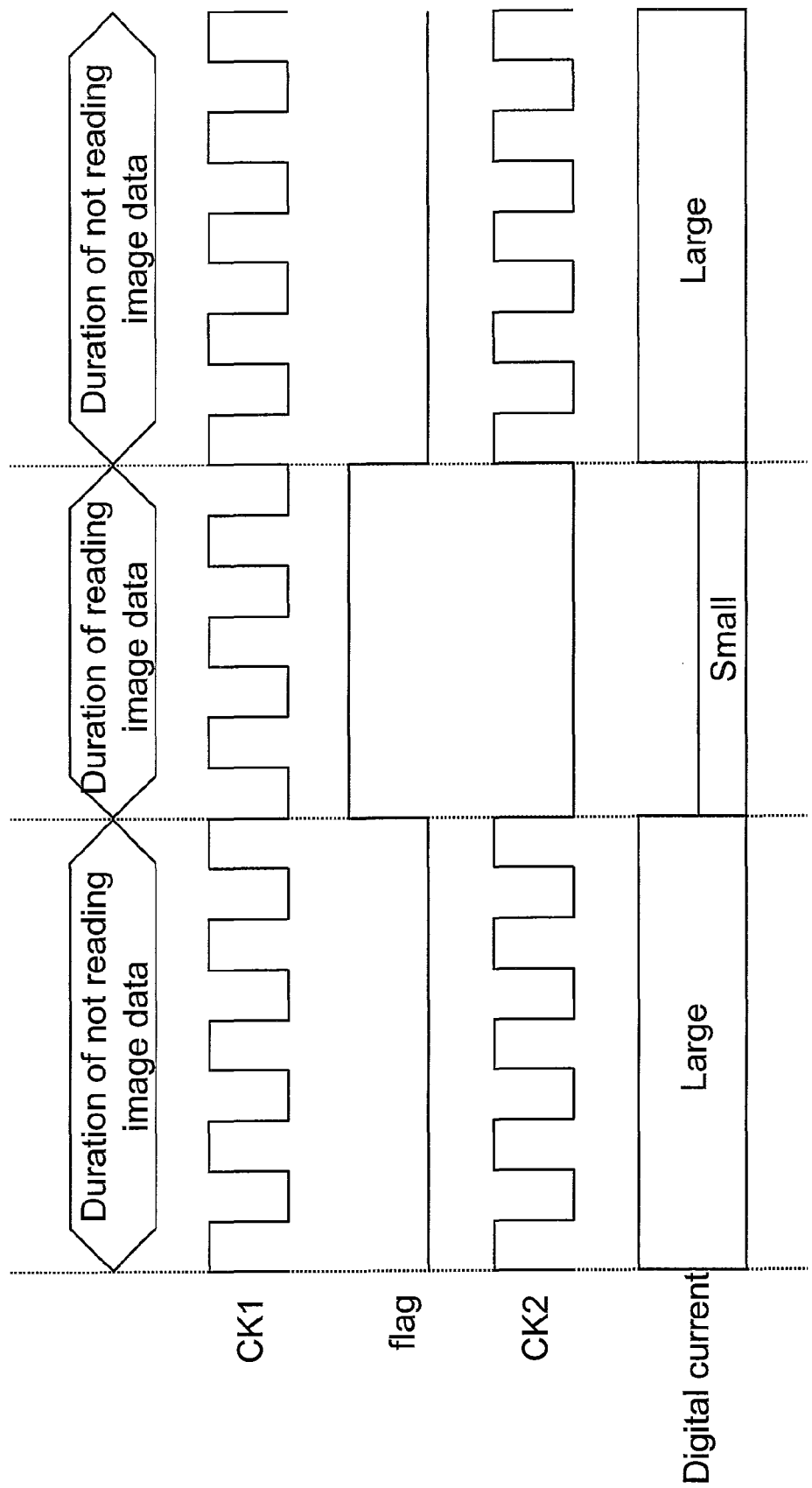
FIG. 2 is a timing relation diagram of each signal according to an embodiment of the present invention.

Referring to FIG. 2, the clock signal CK1 may be classified into a duration of reading image data and a duration of not reading image data. In the duration of not reading the image data, the interrupt circuit 190 receives a flag signal flag of a low level, thereby outputting the received clock signal CK1 to the second logic circuit 170. Therefore, in the duration of not reading the image data, the second logic circuit 170 receives a clock signal CK2 equivalent to the clock signal CK1. At this time, many operating logic circuits exist, so that a relatively large digital current is generated.

In the duration of reading the image data, the interrupt circuit 190 receives a flag signal flag of a high level, thereby interrupting an output of the clock signal CK1. Therefore, in the duration of reading the image data, the second logic circuit 170 may receive a clock signal CK2 of a low level. At this time, fewer operating logic circuits exist, so that a relatively small digital current is generated. In other words, the interrupt circuit 190 interrupts the clock signal CK1 output to the second logic circuit 170, so that the second logic circuit 170 temporally stops working, thereby reducing the number of logic circuits in operation during the process of reading the image data, so as to relatively reduce the digital current generated due to the operation of the logic circuits.

Although the flag signal flag is set as a low level in the duration of not reading the image data, and set as a high level in the duration of reading the image data, the present invention is not limited hereby. In other words, the level of the flag signal flag may be the opposite, i.e., a high level in the duration of not reading the image data, and a low level in the duration of reading the image data.

Figure 3:
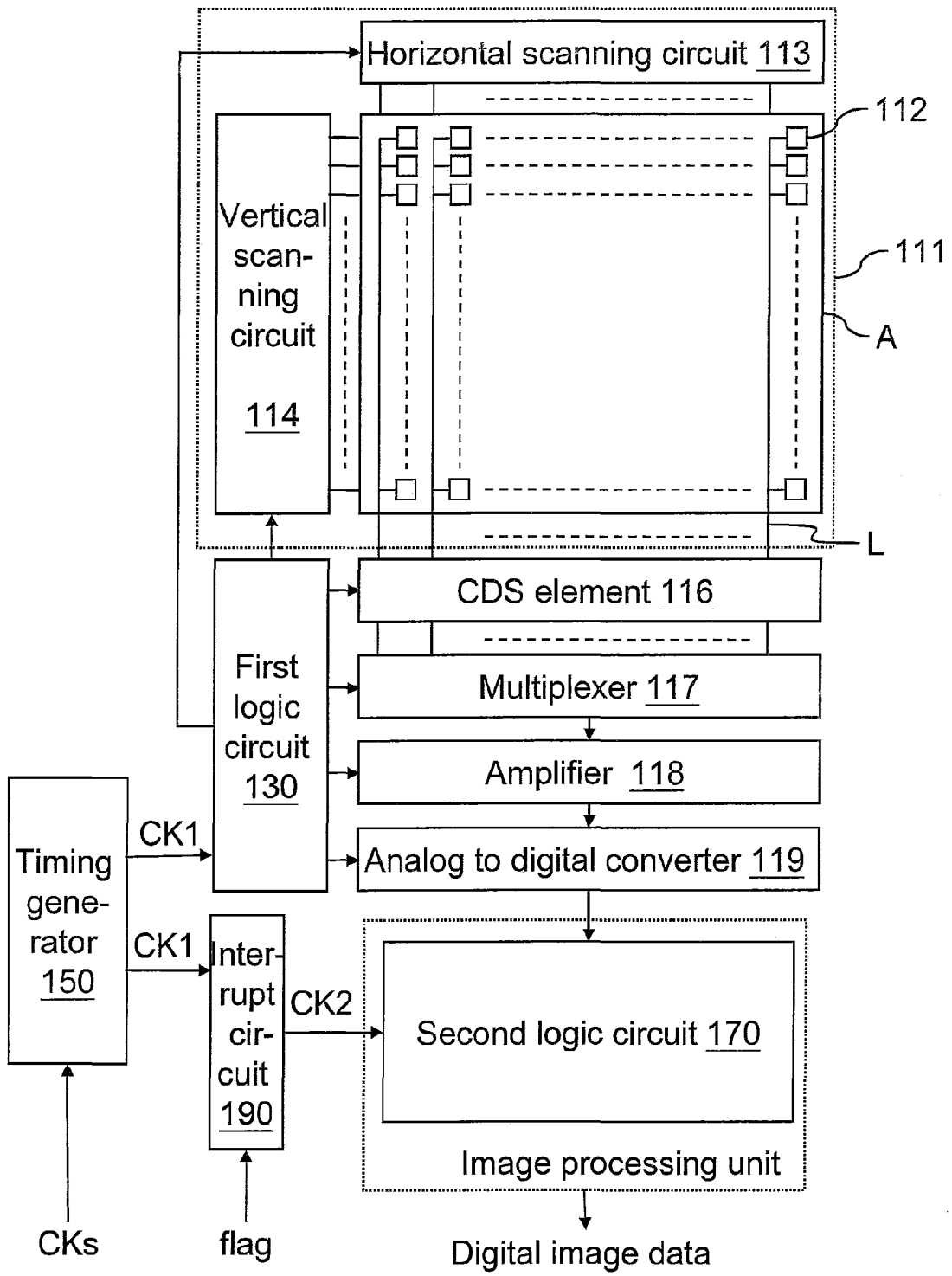
FIG. 3 is a summarized schematic view of an image sensing device according to another embodiment of the present invention.

In an embodiment, referring to FIG. 3, the image array element 111 mainly has a rectangular image capturing area A formed by a plurality of pixel units 112 configured in a two dimensional arrangement. A horizontal scanning circuit 113 may be disposed on an upper part of the image capturing area A. The horizontal scanning circuit 113 extends along a row (horizontal) direction of the pixel units 112 in the image capturing area A. A vertical scanning circuit 114 may be disposed at a side part of the image capturing area. The vertical scanning circuit 114 extends along a column (vertical) direction of the pixel units 112 in the image capturing area. The horizontal scanning circuit 113 and the vertical scanning circuit 114 scan the pixel units 112 in the image capturing area alternately, so as to sense the pixel signals and perform an electronic shutter operation during sensing.

The read circuit 115 may comprise a column processing circuit and an amplifier 118. The column processing circuit is electrically connected to at least a first logic circuit 130 and an image array element 111. The amplifier 118 is electrically connected to at least a first logic circuit 130 and the column processing circuit.

The column processing circuit may be a correlated double sampling (CDS) element 116. A multiplexer 117 may be disposed at a subsequent stage (output end) of the CDS element 116.

The CDS element 116 is disposed at a subsequent stage (output end) of the image array element 111. In the CDS element 116, a plurality of CDS circuits is disposed corresponding to the pixel units 112 in each column respectively.

The pixel signals are read from each column of pixel units 112 in the image array element 111 via corresponding vertical signal lines L and input to the CDS circuit corresponding to the CDS element 116 sequentially, so as to perform noise removal and signal processing on the pixel signals.

The multiplexer 117 is electrically connected between the CDS element 116 and the amplifier 118. The multiplexer 117 may control the signal output of the CDS element 116, i.e., it can select a signal output of a certain column at a time point.

The amplifier 118 may be a programmable gain amplifier.

The analog to digital converter 119 may be disposed at a subsequent stage (output end) of the read circuit 115. The analog to digital converter 119 is electrically connected to an output end of the amplifier 118.

The analog to digital converter 119 receives the image data output after being amplified by the amplifier 118, and converts the read image data from an analog signal into a digital signal. In other words, the analog to digital converter 119 converts the analog image data into the digital image data.

The analog to digital converter 119 may be a $\Delta\Sigma$ modulator.

An image processing unit may be disposed at a subsequent stage (output end) of the analog to digital converter 119. The image processing unit is used for processing digital signals. In other words, the image processing of the analog image data is performed at a front section of the analog to digital converter 119, and the image processing of the digital image data is performed at a back section of the analog to digital converter 119.

The image processing unit may include a second logic circuit 170, and the second logic circuit 170 is used to perform analog image processing.

The image array element 111, the CDS element 116, the multiplexer 117, the amplifier 118, and the analog to digital converter 119 receive a control signal from the first logic circuit 130, and operate according to the received control signal.

The first logic circuit 130 generates the control signal according to the clock signal CK1.

The second logic circuit 170 receives the clock signal CK1 from the interrupt circuit 190, and operates according to the received clock signal CK1.

After receiving system clocks CKs, the timing generator 150 generates the clock signal CK1 to the first logic circuit 130 and the interrupt circuit 190 according to the system clocks CKs.

During the process of reading the image data, the interrupt circuit 190 interrupts the clock signal CK1 input to the second logic circuit 170 according to the flag signal flag, so that the second logic circuit 170 stops working since it does not receive the clock signal CK1 (i.e., the input signal is at a low level). In this manner, during the process of reading the image data, the power noises caused by the current generated during the operation of the logic circuit are reduced.

Figure 4:
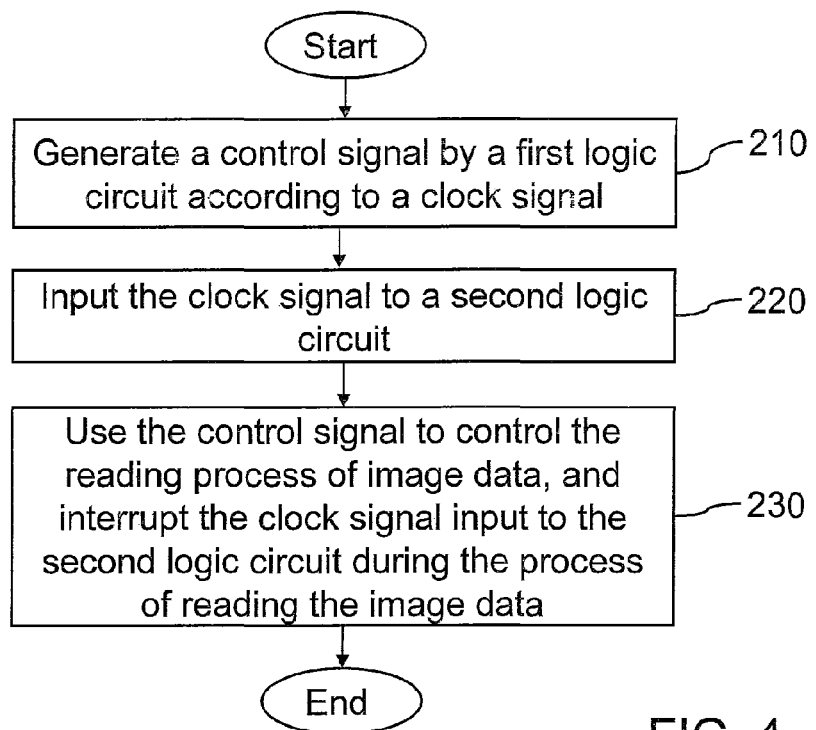
FIG. 4 is a flow chart of an image sensing method according to a first embodiment of the present invention.

FIG. 4 is a flow chart of an image sensing method according to an embodiment of the present invention.

A first logic circuit generates a control signal according to a clock signal (Step 210). The clock signal is input to a second logic circuit (Step 220). The control signal is used to control the reading process of image data, and during a process of reading the image data, the clock signal input to the second logic circuit is interrupted (Step 230).

Figure 5:
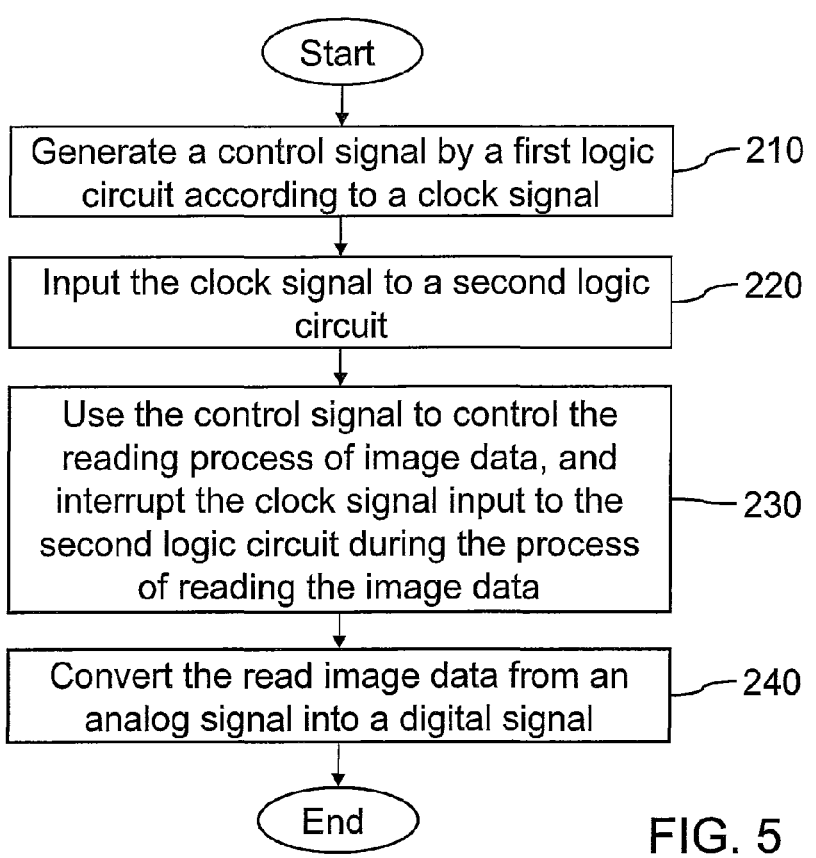
FIG. 5 is a flow chart of an image sensing method according to a second embodiment of the present invention.

Referring to FIG. 5, the read image data may be converted from an analog signal into a digital signal (Step 240), so as to be provided for signal processing of the digital image data by the subsequent processing unit. That is, the read analog image data is converted into the digital image data.

Figure 6:
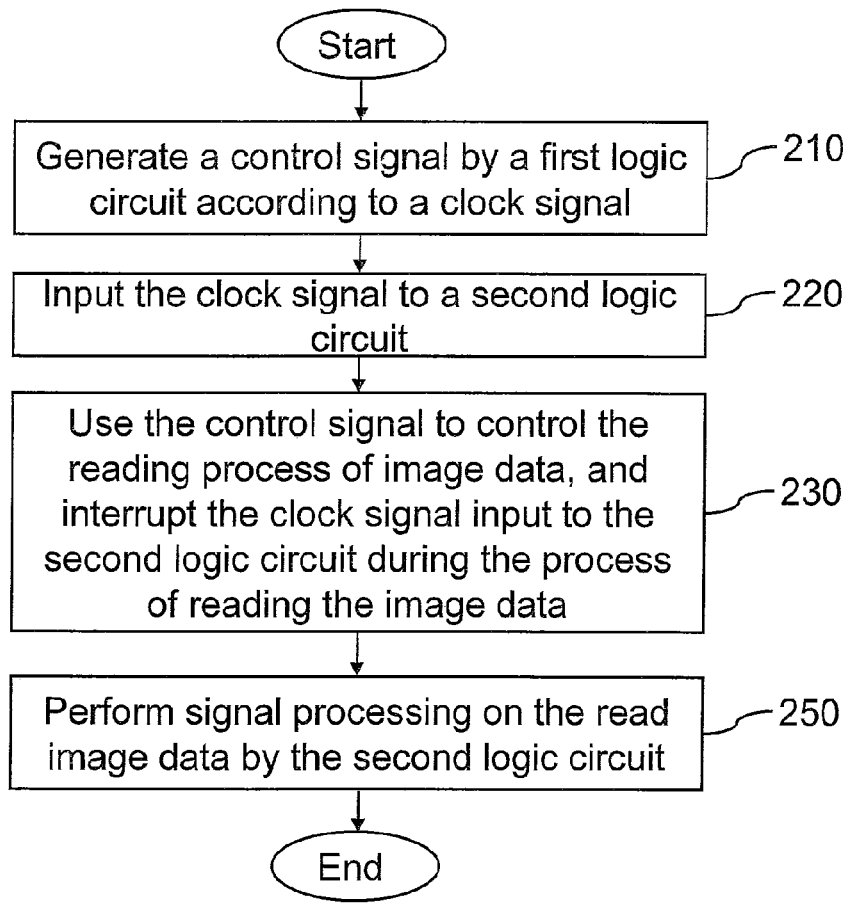
FIG. 6 is a flow chart of an image sensing method according to a third embodiment of the present invention.

Additionally, referring to FIG. 6, the second logic circuit performs signal processing on the read image data according to the clock signal (Step 250).

Figure 7:
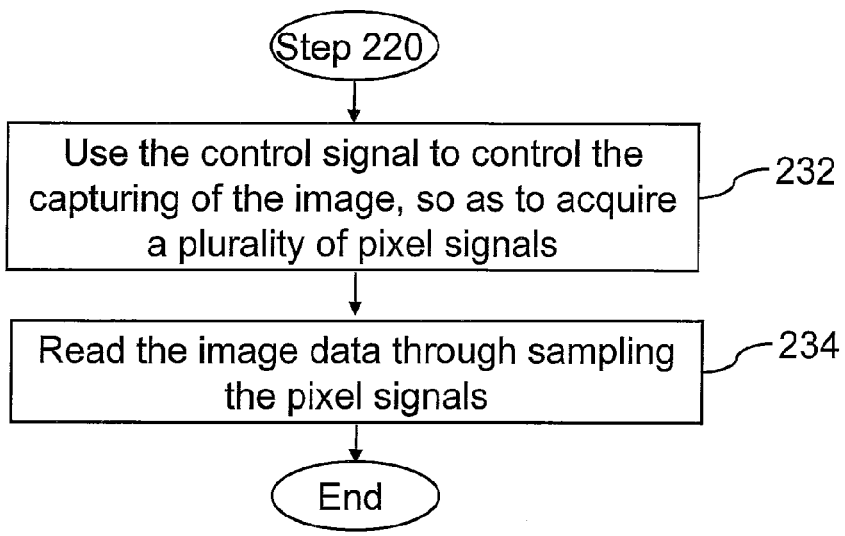
FIG. 7 is a detailed flow chart of reading image data according to an embodiment of the present invention.

Furthermore, referring to FIG. 7, the control signal is used to control the capturing of the image first, so as to acquire a plurality of pixel signals (Step 232), and then the image data is read through sampling the pixel signals (Step 234).

The image sensing device and the image sensing method of the present invention are applicable to the image sensing system, in which the interrupt circuit is used to interrupt the system clock input to the second logic circuit during the process of reading the image data, thereby reducing the power noises caused by the current generated during the operation of the logic circuit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image sensing device, comprising:
    an image capturing circuit, for sensing a capturing signal during a sensing duration, and reading the capturing signal to generate an image signal during a reading duration;
    a first logic circuit for controlling the image capturing circuit according to a clock signal;
    a second logic circuit; and
    an interrupt circuit, electrically connected to the second logic circuit, for providing the clock signal to the second logic circuit during the sensing duration, and stopping the providing of the clock signal to the second logic circuit during the reading duration.

2. The image sensing device according to claim 1, wherein an output end of the interrupt circuit is electrically connected to an input end of the second logic circuit.

3. The image sensing device according to claim 1, wherein the second logic circuit is electrically connected to the image capturing circuit.

4. The image sensing device according to claim 3, further comprising:
    an analog to digital converter, electrically connected to the image capturing circuit and the second logic circuit.

5. The image sensing device according to claim 1, wherein the second logic circuit is separate from the first logic circuit.

6. The image sensing device according to claim 1, further comprising:
    a power supply, electrically connected to the first logic circuit and the second logic circuit.

7. The image sensing device according to claim 1, wherein the image capturing circuit comprises:
    an image array element, electrically connected to the first logic circuit; and
    a read circuit, electrically connected to at least one of the first logic circuit and the image array element.

8. The image sensing device according to claim 7, wherein the read circuit comprises:
    a column processing circuit, electrically connected to at least one of the first logic circuit and the image array element; and
    an amplifier, electrically connected to at least one of the first logic circuit and the column processing circuit.

* * * * *